(12) United States Patent
Maas et al.

(10) Patent No.: US 6,549,488 B2
(45) Date of Patent: Apr. 15, 2003

(54) FIBER-OPTIC HYDROPHONE

(75) Inventors: Steve J. Maas, Austin, TX (US); D. Richard Metzbower, Austin, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 09/901,752

(22) Filed: Jul. 10, 2001

(65) Prior Publication Data

US 2003/0035344 A1 Feb. 20, 2003

(51) Int. Cl.[7] .............................................. H04R 23/00
(52) U.S. Cl. ...................................................... 367/149
(58) Field of Search ................................ 367/149, 172, 367/173; 385/12, 13; 250/227.14, 227.16

(56) References Cited

U.S. PATENT DOCUMENTS

| | | | |
|---|---|---|---|
| 4,193,130 A | 3/1980 | Young et al. | 367/130 |
| 4,525,818 A | 7/1985 | Cielo et al. | 367/149 |
| 4,799,752 A | 1/1989 | Carome | 367/149 |
| 5,253,222 A | 10/1993 | Danver et al. | 367/149 |
| 5,285,424 A | 2/1994 | Meyer | 367/149 |
| 5,317,544 A | 5/1994 | Maas et al. | 367/149 |
| 5,363,342 A | 11/1994 | Layton et al. | 367/149 |
| 5,394,378 A | 2/1995 | Dandridge et al. | 367/149 |
| 5,475,216 A | 12/1995 | Danver et al. | 367/149 |
| 5,504,720 A | 4/1996 | Meyer et al. | 367/149 |
| 5,625,724 A | 4/1997 | Frederick et al. | 367/149 |
| 2002/0097637 A1 * | 7/2002 | Pearce | 367/154 |

OTHER PUBLICATIONS

Goepel, Charles, *An Air–Backed Mandrel Fiber Optic Hydrophone*, U.S. Navy Journal of Underwater Acoustics, vol. 43, No. 2, Apr. 1993.

McDearmon, Graham, *Theoretical Analysis of a Push–Pull Fiber–Optic Hydrophone*, Journal of Lightwave Technology, vol. 125, No. 5, May 1987.

O'Neill, Edward, *Pressure–Balanced High–Pressure Hydrophone*, The Journal of the Acoustical Society of Americas, vol. 34, No. 10, Oct. 1962.

* cited by examiner

*Primary Examiner*—Daniel T. Pihulic

(57) ABSTRACT

There is provided a fiber-optic hydrophone having a compliant sensing mandrel coaxial with and adjacent to a rigid reference mandrel. A first optical fiber is wound around the compliant sensing mandrel and a second optical fiber is wound around the reference mandrel. The first and second optical fibers comprise different arms of an interferometer. Flexible sealing members, such as O-rings, seal the compliant sensing mandrel to the hydrophone. One O-ring is disposed near each end of the sensing mandrel. A cylindrical support member is disposed inside the sensing mandrel. At least a portion of the support member is spaced from the sensing mandrel so as to provide a sealed cavity between the sensing mandrel and the support member. The sealed cavity is filled with air or similar compliant substance.

72 Claims, 8 Drawing Sheets

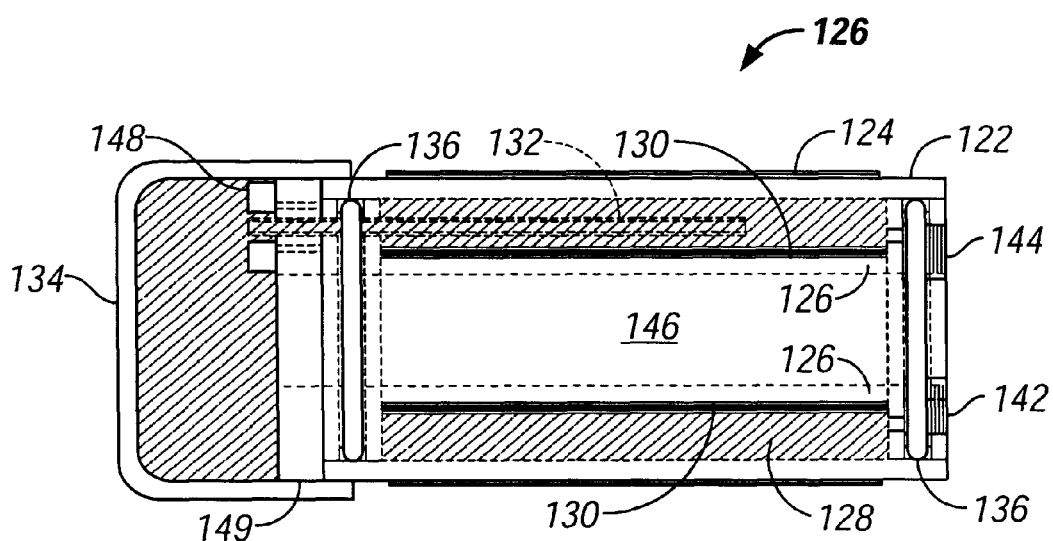
FIG. 5A
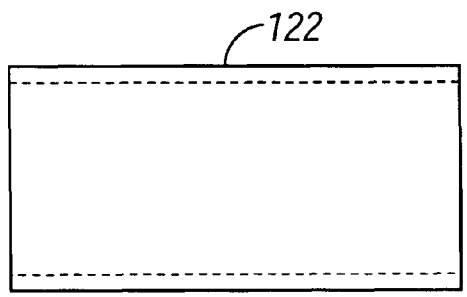
FIG. 5B
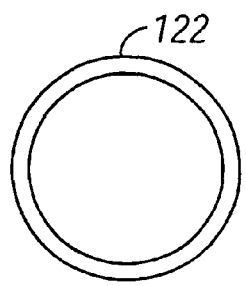
FIG. 5C
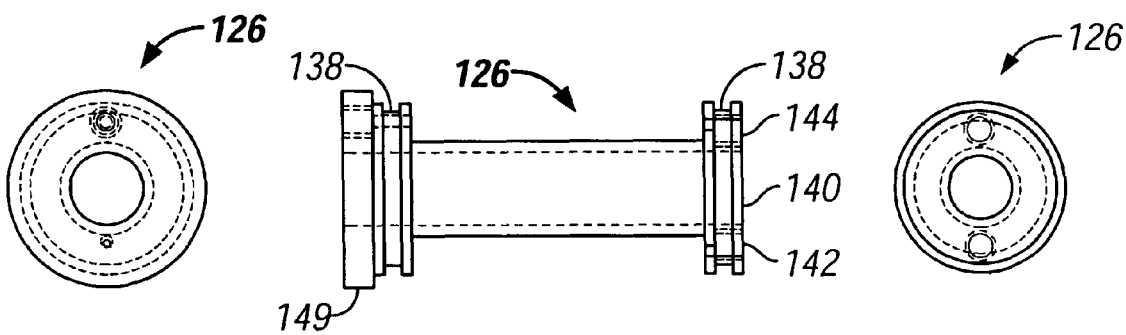
FIG. 5D  FIG. 5E  FIG. 5F

FIBER-OPTIC HYDROPHONE

BACKGROUND OF THE INVENTION

The present invention generally relates to fiber optic hydrophone sensors used in seismic offshore mineral exploration and, more particularly, is concerned with a fiber-optic hydrophone sensor with improved performance and life when used in severe environments of high hydrostatic pressures.

The concept of using an optical fiber in sensing applications is not new. The U.S. Naval Research Laboratory (NRL) has been a leader in this area. NRL and others have disclosed a number of optical systems. U.S. Pat. No. 4,648,083 to Tom Gialorenzi of the Naval Research Lab, incorporated herein by reference, describes a typical fiber optic system. In this case optical phase equivalent to acoustic pressure in a hydrophone was measured. Common fiber optic hydrophone sensors consist of coils of optical fiber wrapped around mandrels. U.S. Pat. No. 4,525,818 to Cielo et al., incorporated herein by reference, illustrates such a fiber optic hydrophone. The fiber optic coils are attached to optical couplers to create an interferometer. The physical phenomenon being measured is directly converted into differential optical phase by acting on the interferometer. The acoustic pressures act on the arms of the interferometer creating an optical phase shift in the interferometer. U.S. Pat. No. 5,363,342 to Layton et al., incorporated herein by reference, and U.S. Pat. No. 5,285,424 to Meyer, incorporated herein by reference, discusses the fiber optic hydrophone in more detail. In this case the two arms of the interferometer are wound around two separate mandrels, one placed inside the other, creating a concentric mandrel configuration. An air cavity between the two mandrels is used to enhance the sensitivity of the hydrophone.

Another optical approach consists of fiber Bragg grating based sensors. The fiber Bragg gratings can be used in different manners to measure a given phenomenon. The first method is to use the grating as reflector, creating a Fabry-Perot or Michelson interferometer. With the Fabry-Perot interferometer a similar change in the phase of the light is measured. In the second method the grating itself is the sensor. Strain on the grating changes the period of the grating, which changes the wavelength of light reflected from the grating. This wavelength change is proportional to the strain on the grating.

FIG. 1 shows a typical hydrophone sensor. The sensor, generally designated G, is a pressure sensor and is typically used to measure acoustic pressures in water-covered areas. The sensor G consists of an outer, sensing mandrel A that is compliant and is wrapped with an optical fiber B around its outer circumference. The sensor G also has an inner, reference mandrel C that is rigid and wrapped with an optical fiber D around its outer circumference. The mandrels are attached to end caps E on each end with epoxy or urethane sealant to prevent air in the air cavity F between the compliant and rigid mandrel from escaping. The sensor G is placed in the vicinity of an acoustic seismic source. The acoustic source generates an acoustic wave in the water. The reflected acoustic wave acts on the sensor G. The wave's pressure variation produces a temporary deformation of the compliant sensing mandrel A, as illustrated by the dashed line in FIG. 1. The optical fiber coil B wrapped around the sensing mandrel stretches and contracts in relation to changes in shape of the sensing mandrel A. Light traversing the optical fiber B on the sensing mandrel A travels a slightly longer distance when the fiber is stretched due to deformation of the sensing mandrel A. However, the reference mandrel C is rigid, and is also acoustically isolated from the incident pressure wave. Therefore, it does not deform in response to the passing pressure wave. The optical fiber D wrapped around the reference mandrel therefore does not stretch or contract in response to the incident wave, and provides a reference path length for the light it carries. Light traversing the stretched sensing fiber B is shifted in phase with respect to light traversing the unstretched reference fiber D. As the pressure wave passes the sensor, the interferometer measures the optical phase shift between the light beams exiting the two fibers B and D. The measured phase difference is proportional to the pressure variation in the reflected acoustic wave.

Hydrophone sensors in common use, such as the one shown in FIG. 1, have several inherent problems and limitations. All these sensors rely on the acoustic pressure acting on a sensing mandrel to induce strain in the fiber. They also rely on an air-filled, compliant cavity between the sensing and reference mandrels to enhance the scale factor. The air filled cavity is formed by sealing the ends of the mandrels to the end caps with epoxy and/or urethane sealant. Deformation of the sensing mandrel as described above significantly strains the rigid epoxy or urethane used to form the seals. In the event that a seal fails, the air cavity becomes flooded with water and the acoustic sensitivity of the hydrophone decreases significantly. Repeated deformation straining of the air cavity seals from repeated use of the sensor in seismic exploration eventually results in fatigue-induced failure of a seal, and of the hydrophone.

Yet another problem with sensors in present use is experienced when the sensors are exposed to high hydrostatic pressures, as when the sensor is placed on the ocean floor. Some current seismic studies use hydrophone sensors at depths up to 3000 meters. The very high hydrostatic pressures encountered at these ocean depths cause their outer mandrels to buckle and the sensors to fail. The probability of failure increases with use of a sensor because the outer, sensing mandrel becomes fatigued by repeated pressure cycling induced deformations.

Consequently, a need exists for a fiber-optic hydrophone sensor having improved performance and life. Specifically, the improved hydrophone sensor should be highly reliable and durable when repeatedly used many times over in severe environments of high hydrostatic pressures.

SUMMARY OF THE INVENTION

The present invention addresses the aforementioned need. According to one example embodiment of the invention, there is provided a fiber-optic hydrophone comprising a compliant sensing mandrel and a first optical fiber wound around the compliant sensing mandrel. A rigid reference mandrel is positioned adjacent to the compliant sensing mandrel. A second optical fiber is wound around the rigid reference mandrel. The first and second optical fibers comprise different arms of an interferometer. At least one flexible sealing member seals the compliant sensing mandrel to the hydrophone. A support member is disposed at least partially inside the sensing mandrel. At least a portion of the support member is spaced from the sensing mandrel so as to provide a sealed cavity between the sensing mandrel and the support member.

According to a second example embodiment of the invention, a fiber-optic hydrophone comprises a compliant sensing mandrel and a first optical fiber wound around the compliant sensing mandrel. A rigid reference mandrel surrounds the compliant sensing mandrel. The reference mandrel is spaced from the sensing mandrel so as to provide a sealed cavity therebetween. A second optical fiber is wound around the rigid reference mandrel. The first and second optical fibers comprise different arms of an interferometer. For each mandrel, at least one flexible sealing member seals the mandrel to the hydrophone. A support member is disposed inside the sensing mandrel. The support member is spaced from the sensing mandrel so as to provide a channel therebetween for providing fluid communication therein with the sensing mandrel. Means for providing fluid flow into the channel is also provided.

According to a third example embodiment of the invention, a fiber-optic hydrophone comprises a compliant sensing mandrel and a first optical fiber wound around the compliant sensing mandrel. A rigid reference mandrel is positioned adjacent the compliant sensing mandrel. A second optical fiber is wound around the rigid reference mandrel. The first and second optical fibers comprise different arms of an interferometer. A housing encloses the sensing and reference mandrels and the first and second optical fibers wound thereon. The housing is spaced from the sensing mandrel and first optical fiber so as to provide a sealed cavity therebetween. At least one flexible sealing member seals the housing to at least one of the sensing mandrel and the reference mandrel. A support member is disposed inside the sensing mandrel. The support member is spaced from the sensing mandrel so as to provide a channel therebetween for providing fluid communication therein with the sensing mandrel. Means for providing fluid flow into the channel is also provided.

According to a fourth example embodiment of the invention, a fiber-optic hydrophone comprises a compliant sensing mandrel and a first optical fiber wound around the compliant sensing mandrel. A rigid reference mandrel is positioned inside the sensing mandrel. At least a portion of the reference mandrel is spaced from the sensing mandrel so as to provide a channel therebetween for providing fluid for pressure equalization therein with the sensing mandrel. A second optical fiber is wound around the rigid reference mandrel. The first and second optical fibers comprise different arms of an interferometer. At least one flexible sealing member seals the sensing mandrel to the hydrophone. A tube is in fluid communication with the channel for permitting pressure equalization and frequency roll-off between the exterior of the hydrophone and the channel. The tube responds to D.C. pressure while filtering A.C. pressure of the acoustic signals. The tube responds to hydrostatic pressure while excluding hydrodynamic pressure changes of acoustic signals.

According to a fifth example embodiment of the invention, a fiber-optic hydrophone comprises a compliant sensing mandrel and a first optical fiber wound around the compliant sensing mandrel. A rigid reference mandrel is positioned inside the sensing mandrel. At least a portion of the reference mandrel is spaced from the sensing mandrel so as to provide a sealed cavity between the sensing mandrel and the reference mandrel. A second optical fiber is wound around the rigid reference mandrel. The first and second optical fibers comprise different arms of an interferometer. A pair of O-rings seals the sensing mandrel to the reference mandrel.

According to a sixth example embodiment of the invention, a method for detecting pressure in a marine environment comprises sensing motion of a first body in response to a pressure wave. The first body is in movable contact with a cavity. The cavity is defined, in part, by a first body and a second body. The method further comprises flexibly isolating the cavity from the marine environment at a joint between the first body and the second body.

According to a seventh example embodiment of the invention, a system for detecting pressure in a marine environment comprises means for sensing motion of a first body in response to a pressure wave. The first body is in movable contact with a cavity. The cavity is defined, in part, by a first body and a second body. The system further comprises means for flexibly isolating the cavity from the marine environment at a joint between the first body and the second body.

BRIEF DESCRIPTION OF THE DRAWINGS

For a more complete understanding of the present invention, and the advantages thereof, reference is now made to the following Detailed Description of the Invention taken in conjunction with the accompanying drawings, in which:

FIG. 5A is a cross sectional view along the longitudinal centerline of a fiber-optic hydrophone of a fourth embodiment of the invention in which the reference mandrel is positioned inside the sensing mandrel, and having a fluid filled channel between the two mandrels.

FIGS. 5B–5F illustrate the component parts of the hydrophone of FIG. 5A.

DETAILED DESCRIPTION OF THE INVENTION

Figure 1:
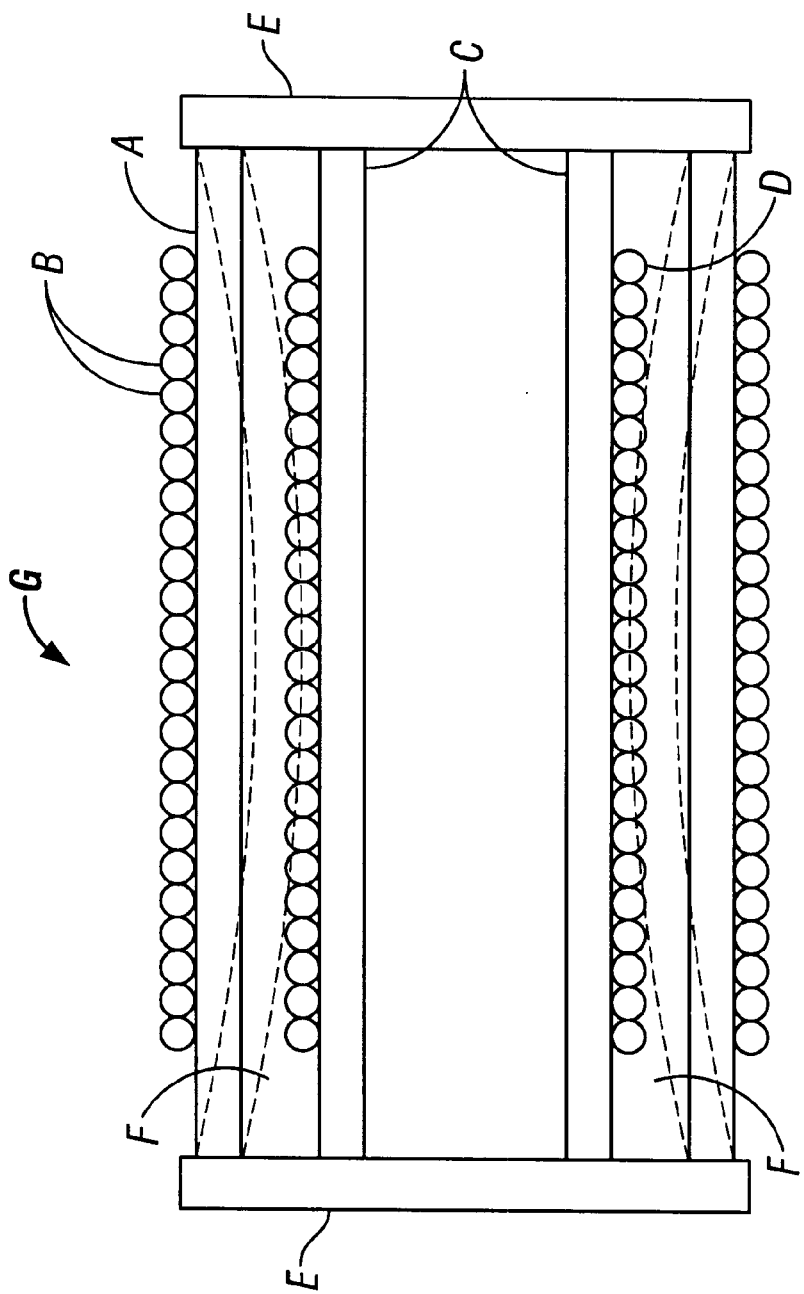
FIG. 1 is a cross sectional view along the longitudinal centerline of a fiber-optic hydrophone of the prior art.

Example embodiments of the present invention and their advantages are best understood by referring to the drawings, like numerals being used for like and corresponding parts of the various drawings.

Figure 2A:
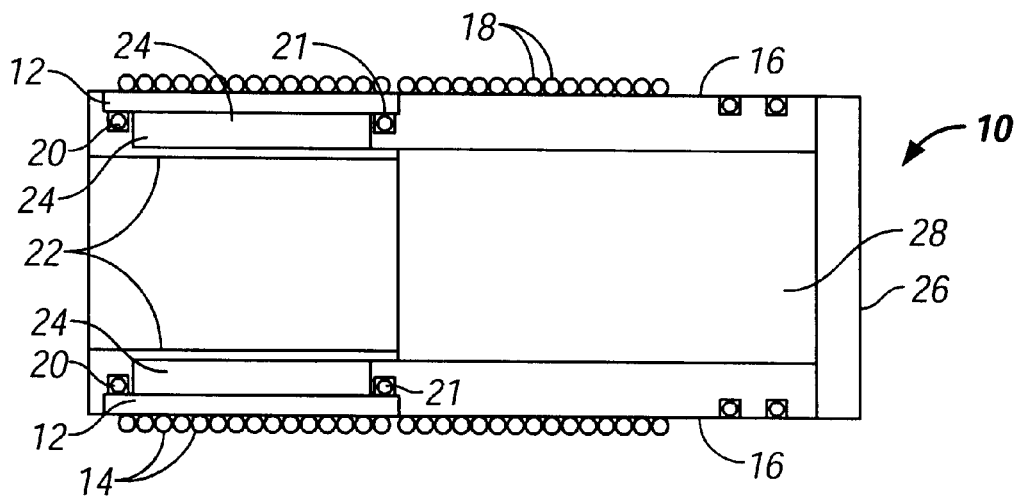
FIG. 2A is a cross sectional view along the longitudinal centerline of a fiber-optic hydrophone of a first embodiment of the invention, in which the sensing and the reference fiber optic coils are on the exterior of the hydrophone adjacent to each other.
Figure 2B:
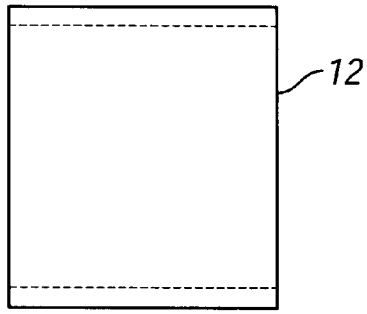
FIGS. 2B–2D illustrate the component parts of the hydrophone of FIG. 2A.
Figure 2C:
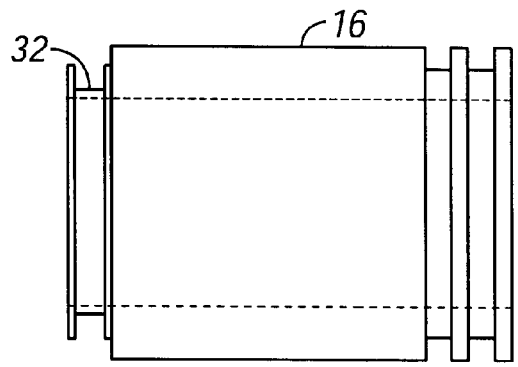

In FIG. 2A, there is shown a fiber-optic hydrophone, generally designated 10, according to a first embodiment of the present invention. Hydrophone 10 is shown in cross sectional view along its longitudinal centerline. Hydrophone 10 includes a compliant sensing mandrel 12 and a first optical fiber 14 wound around sensing mandrel 12. FIG. 2B is a side elevation view of sensing mandrel 12. A rigid reference mandrel 16 is positioned adjacent to sensing mandrel 12. FIG. 2C is a side elevation view of reference mandrel 16. A second optical fiber 18 is wound around reference mandrel 16. First and second optical fibers 14 and 18, respectively, comprise different optical arms of an optical interferometer. O-rings 20 and 21, disposed near the opposite ends of sensing mandrel 12, seal sensing mandrel 12 to hydrophone 10. Alternatively, other suitable flexible sealing members (not shown) may be used instead of O-rings 20 and 21.

Figure 2D:
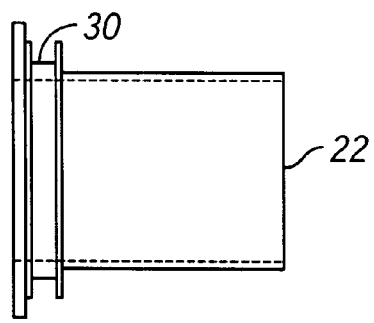

A support member 22 is disposed at least partially inside sensing mandrel 12. FIG. 2D is a side elevation view of support member 22. At least a portion of support member 22 is spaced from sensing mandrel 12 so as to provide a sealed cavity 24 between sensing mandrel 12 and support member 22. O-ring 20 fits within groove 30 of support member 22. O-ring 21 fits within groove 32 of reference mandrel 16. A cap 26 closes at least one end of hydrophone 10 so as to prevent entry of environmental fluids into hydrophone 10. The interior 28 of hydrophone 10 contains the optical coupler and other optical components and potted solid.

Hydrophone 10, sensing mandrel 12, reference mandrel 16, and support member 22 are generally tubular in shape in the illustrated example embodiments. However, other shapes will occur to those of skill in the art. As seen in FIG. 2A, reference mandrel 16 is in a substantially coaxial relationship with sensing mandrel 12. Sealed cavity 24 is filled with air in some embodiments. In alternative embodiments, sealed cavity 24 includes an acoustic impedance matching fluid. Other fluids/gasses will occur to those of skill in the art.

O-rings 20 and 21 provide the seal for cavity 24 so as to prevent entry of environmental fluids therein. O-rings 20 and 21 also provide flexible seals at the ends of sensing mandrel 12. The flexible seals permit sensing mandrel 12 to deform many times repeatedly in response to incident seismic pressure waves without failure of the seals, as would occur if the seals were rigid. Thus, the useful life of hydrophone 10 is greatly extended. Other seals, and other shapes requiring a different number of seals, will occur to those of skill in the art.

Figure 3A:
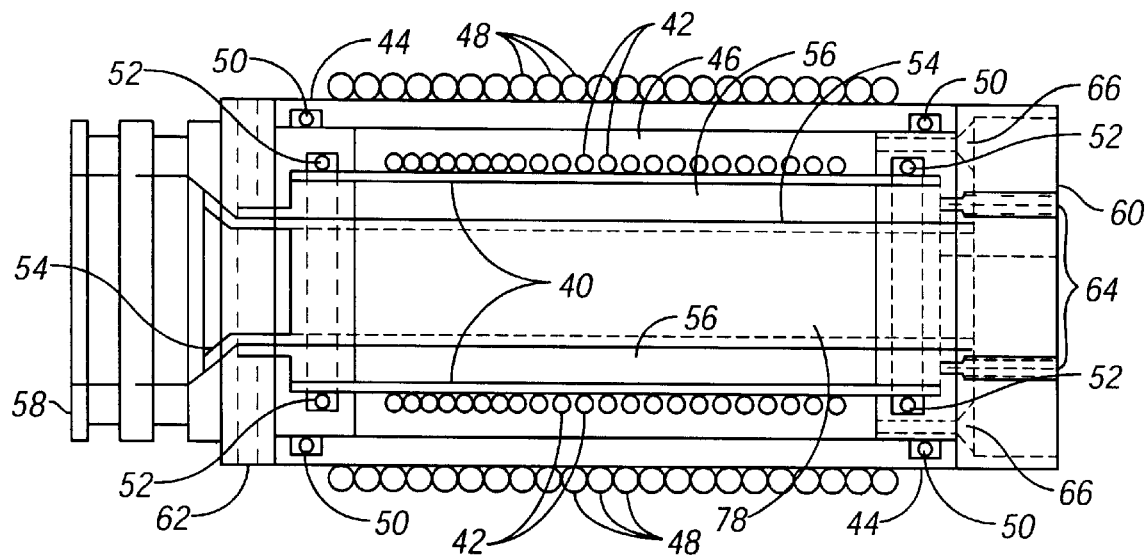
FIG. 3A is a cross sectional view along the longitudinal centerline of a fiber-optic hydrophone of a second embodiment of the invention, in which the sensing mandrel is positioned inside the reference mandrel.
Figure 3B:
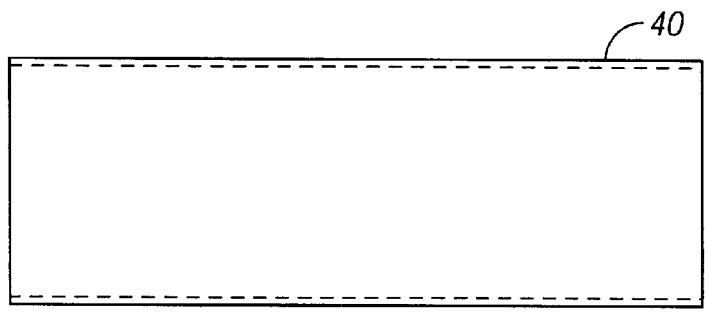
FIGS. 3B–3H illustrate the component parts of the hydrophone of FIG. 3A.
Figure 3C:
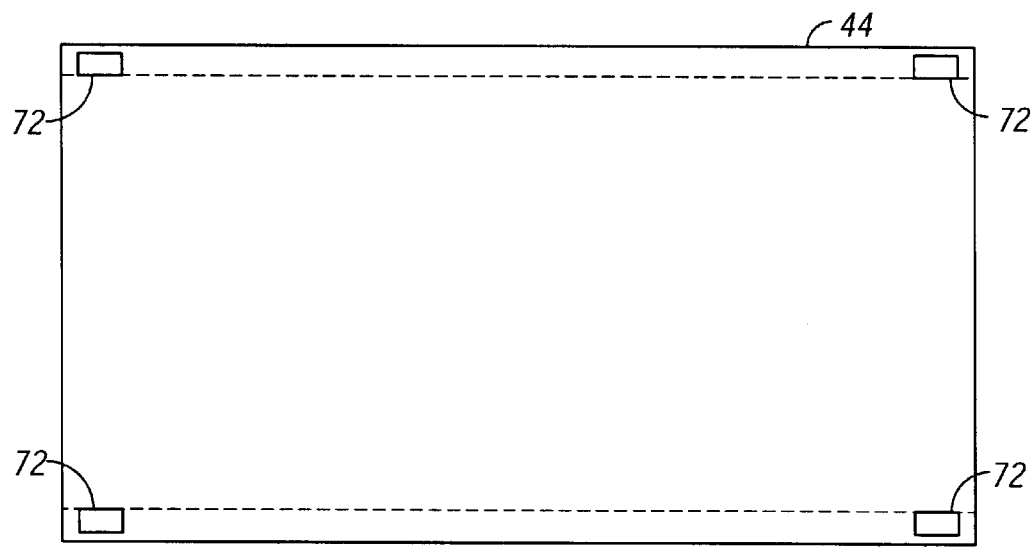

Referring now to FIG. 3A, there is shown a fiber-optic hydrophone, generally designated 38, according to a second embodiment of the invention. Hydrophone 38 includes a compliant sensing mandrel 40 and a first optical fiber 42 wound around sensing mandrel 40. FIG. 3B is a side elevation view of sensing mandrel 40. A rigid reference mandrel 44 surrounds sensing mandrel 40. FIG. 3C is a side elevation view of reference mandrel 44. Reference mandrel 44 is spaced from sensing mandrel 40 so as to provide a sealed cavity 46 therebetween. A second optical fiber 48 is wound around reference mandrel 44. First and second optical fibers 42 and 48, respectively, comprise different optical arms of an interferometer.

O-rings 50, disposed near the ends of reference mandrel 44, seal reference mandrel 44 to hydrophone 38. O-rings 52, disposed near the ends of sensing mandrel 40, seal sensing mandrel 40 to hydrophone 38. Alternatively, other suitable flexible sealing members (not shown) are used instead of O-rings 50 and 52, as will occur to those of skill in the art.

Figure 3D:
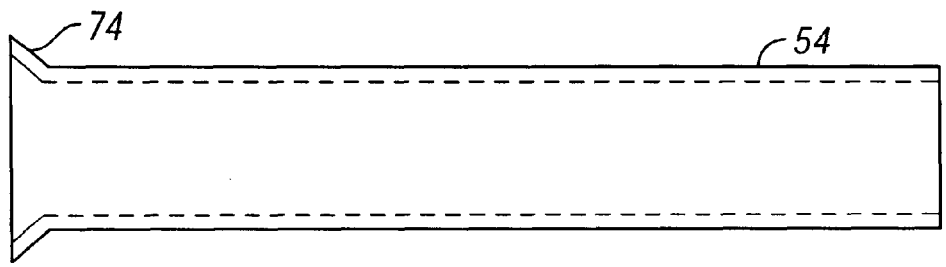

A support member 54 is disposed inside sensing mandrel 40. FIG. 3D is a side elevation view of support member 54. Support member 54 is spaced from sensing mandrel 40 so as to provide a channel 56 therebetween for providing fluid communication therein with sensing mandrel 40. Sensing mandrel 40, reference mandrel 44, and support member 54 are tubular in shape in this example embodiment. However, other shapes will occur to those of skill in the art. Sensing mandrel 40 is disposed concentrically and coaxially within reference mandrel 44. Similarly, support member 54 is disposed concentrically and coaxially within sensing mandrel 40. The interior 78 of hydrophone 38 contains the optical coupler and other optical components and is potted solid.

Figure 3E:
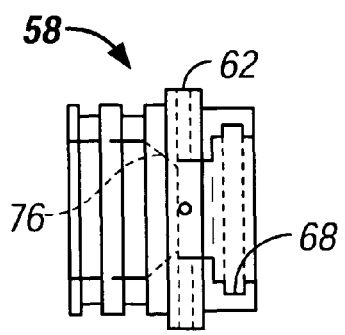
Figure 3F:
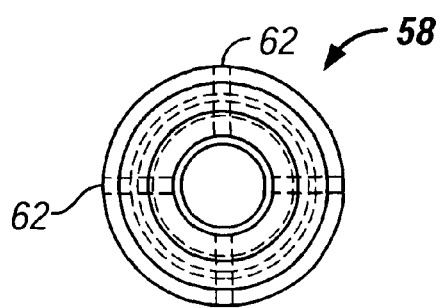
Figure 3G:
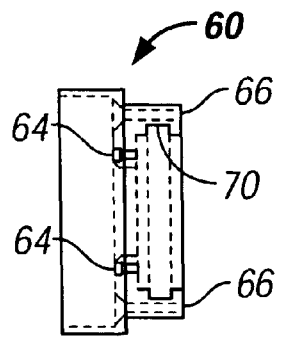
Figure 3H:
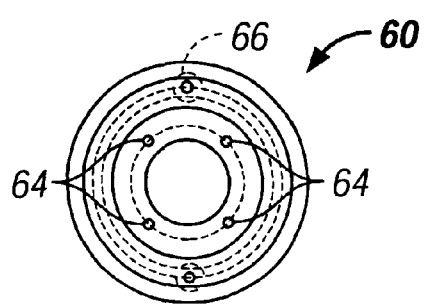

Hydrophone 38 includes end caps 58 and 60 for securing the mandrels 40 and 44 to hydrophone 38 and in spaced relation to one another. FIGS. 3E and 3F are side and end elevation views, respectively, of end cap 58. FIGS. 3G and 3H are side and end elevation views, respectively, of end cap 60.

Channel orifices 62 in end cap 58 provide for fluid flow into fluid channel 56. Channel orifices 64 in end cap 60 also provide for fluid flow into fluid channel 56. Sealed cavity orifices 66 in end cap 60 permit access from the exterior of hydrophone 38 to sealed cavity 46. End cap 58 has a groove 68 formed therein for retaining O-ring 52 in sealing engagement with one end of sensing mandrel 40. End cap 60 has a groove 70 formed therein for retaining another O-ring 52 in sealing engagement with the opposite end of sensing mandrel 40. Reference mandrel 44 has grooves 72 formed therein for retaining O-rings 50 in sealing engagement with end caps 58 and 60. Support member 54 comprises a tube having one end 74 flared for engagement with a mating surface 76 of end cap 58. Sealed cavity 46 is filled with air or an acoustic impedance matching fluid.

O-rings 50 and 52 provide the seal for cavity 46 so as to prevent entry of environmental fluids therein. O-rings 50 and 52 also provide flexible seals at the ends of sensing mandrel 40. The flexible seals permit sensing mandrel 40 to deform many times repeatedly in response to incident seismic pressure waves without failure of the seals, as would occur if the seals were rigid. Thus, the useful life of hydrophone 38 is greatly extended. Other seals, and other shapes requiring a different number of seals, will occur to those of skill in the art.

Hydrophone 38 also overcomes another shortcoming found in prior hydrophone sensors. As discussed above, the very high hydrostatic pressures encountered where hydrophone sensors are often used can cause their outermost, sensing mandrels to crush or buckle and the sensors to fail. However, the compliant sensing mandrel 40 of hydrophone 38 is exposed to the environmental hydrostatic pressure on its interior, through channel 56, rather than on its exterior, as in prior hydrophone sensor designs. The internal burst strength of a thick walled tube is at least 125% greater than its crush strength. The actual degree of increase depends on a number of factors including: mandrel diameter, mandrel wall thickness, and number of fiber layers. In hydrophone 38, only the rigid reference mandrel 44 and its optical fiber 48 are exposed to the hydrostatic pressure on their exterior. Therefore, exposing the interior rather than the exterior of the sensing mandrel to the hydrostatic pressure increases the effective pressure rating of hydrophone 38 by at least 125%. The actual increase depends on a number of factors including: mandrel diameter, mandrel wall thickness, and number of fiber layers.

Sensing mandrel 40 is further strengthened by the coils of first optical fiber 42 wound around it. In order for hydrophone 38 to fail from excessive hydrostatic pressure, the pressure must overcome either the combined burst strength of sensing mandrel 40 and first optical fiber 42, or overcome the crush strength of rigid reference mandrel 44 and its optical fiber 48. By virtue of its greater thickness and rigidity, reference mandrel 44 can withstand higher external hydrostatic pressures than can compliant sensing mandrel 40. Therefore, the hydrostatic pressure rating of hydrophone 38 is significantly improved over that of prior sensors.

Figure 4B:
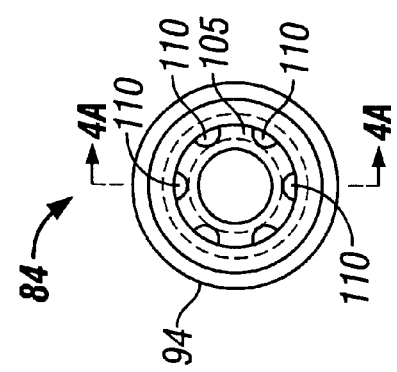
FIG. 4B is a cross sectional view taken along line B—B in FIG. 4A.
Figure 4A:
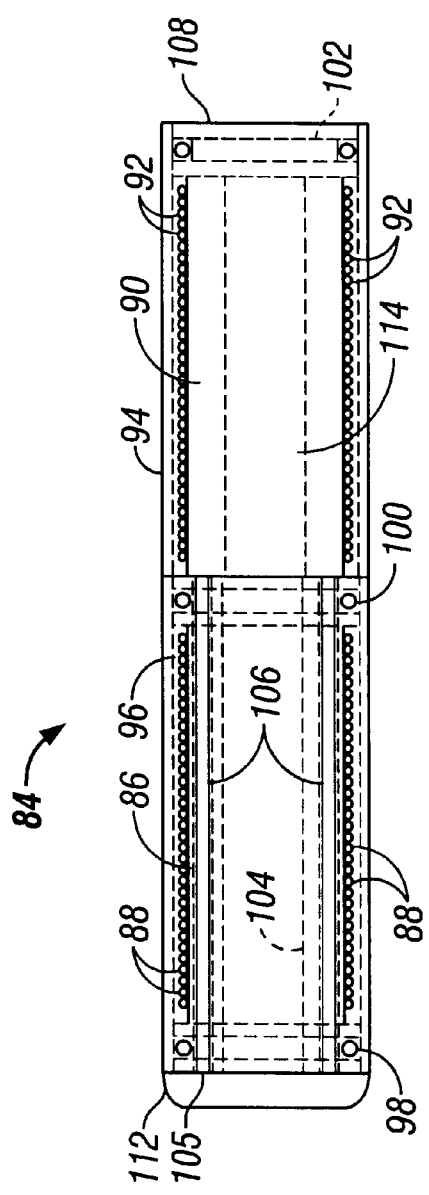
FIG. 4A is a cross sectional view along the longitudinal centerline of a fiber-optic hydrophone of a third embodiment of the invention, in which the sensing and the reference mandrels are positioned adjacent to each other within a rigid housing.

Referring now to FIG. 4A, there is shown a fiber-optic hydrophone, generally designated 84, according to a third embodiment of the invention. FIG. 4A is a cross-sectional view taken along line B—B in FIG. 4B. Hydrophone 84 includes a compliant sensing mandrel 86 and a first optical fiber 88 wound around sensing mandrel 86. A rigid reference mandrel 90 is positioned adjacent sensing mandrel 86. A second optical fiber 92 is wound around reference mandrel 90. First and second optical fibers 88 and 92, respectively, comprise different arms of an interferometer. A housing 94 encloses sensing mandrel 86, first optical fiber 88, reference mandrel 90, and second optical fiber 92. Housing 94 is spaced from sensing mandrel 86 and first optical fiber 88 so as to provide a sealed cavity 96 therebetween.

O-rings 98, 100, and 102 seal housing 94 to at least one of sensing mandrel 86 and reference mandrel 90. O-rings 98 and 100 are disposed near each end of sensing mandrel 86. O-ring 102 is disposed near the end of hydrophone 84 opposite sensing mandrel 86. Alternatively, other suitable flexible sealing members (not shown) are used instead of O-rings 98, 100, and 102, as will occur to those of skill in the art.

Support member 104 is disposed inside sensing mandrel 86, but is spaced from the sensing mandrel 86 so as to provide a channel 106 therebetween for providing fluid communication therein with sensing mandrel 86. Support member 104 includes a flange 105 on one end. A plurality of orifices 110 in flange 105 provide means for fluid flow from the exterior of hydrophone 84 into channel 106. A cap 108 closes one end of hydrophone 84 so as to prevent entry of environmental fluids therein. A flexible membrane 112 covers orifices 110 for retaining a fluid, such as oil, in channel 106. The fluid fills the interior of flexible membrane 112 and is in fluid communication with channel 106. Sensing mandrel 86, reference mandrel 90, and support member 104 are tubular in shape in this example embodiment. However, other shapes will occur to those of skill in the art. Sensing mandrel 86 and reference mandrel 90 are disposed end-to-end and coaxially. The interior 114 of hydrophone 84 contains the optical coupler and other optical components and is potted solid. Sealed cavity 96 is filled with air or an acoustic impedance matching fluid.

O-rings 98 and 100 provide the seal for cavity 96 so as to prevent entry of environmental fluids therein. O-rings 98 and 100 also provide flexible seals at the ends of sensing mandrel 86. The flexible seals permit sensing mandrel 86 to deform many times repeatedly in response to incident seismic pressure waves without failure of the seals, as would occur if the seals were rigid. Thus, the useful life of hydrophone 84 is greatly extended. Other seals, and other shapes requiring a different number of seals, will occur to those of skill in the art.

Hydrophone 84 also overcomes another shortcoming found in prior hydrophone sensors. As discussed above, the very high hydrostatic pressures encountered where hydrophone sensors are often used can cause their outermost, sensing mandrels to crush or buckle and the sensors to fail. However, the compliant sensing mandrel 86 of hydrophone 84 is exposed to the environmental hydrostatic pressure on its interior, through channel 106, rather than on its exterior, as in prior hydrophone sensor designs. The burst strength of a tube is at least 125% greater than its crush strength. The actual increase depends on a number of factors including: mandrel diameter, mandrel wall thickness, and number of fiber layers. In hydrophone 84, only the rigid reference mandrel 90 and its optical fiber 92 are exposed to the hydrostatic pressure on their exterior. Therefore, exposing the interior rather than the exterior of the sensing mandrel to the hydrostatic pressure increases the effective pressure rating of hydrophone 84 by a factor of approximately four.

Sensing mandrel 86 is further strengthened by the coils of first optical fiber 88 wound around it. In order for hydrophone 84 to fail from excessive hydrostatic pressure, the pressure must overcome either the combined burst strength of sensing mandrel 86 and first optical fiber 88, or overcome the crush strength of rigid reference mandrel 90 and its optical fiber 92. By virtue of its greater thickness and rigidity, reference mandrel 90 can withstand higher external hydrostatic pressures than can compliant sensing mandrel 86. Therefore, the hydrostatic pressure rating of hydrophone 84 is significantly improved over that of prior sensors.

Referring now to FIG. 5A, there is shown a fiber-optic hydrophone, generally designated 120, according to a fourth embodiment of the invention. Hydrophone 120 includes a compliant sensing mandrel 122 and a first optical fiber 124 wound around the sensing mandrel 122. FIGS. 5B and 5C are side elevation and end views, respectively, of sensing mandrel 122. A rigid reference mandrel 126 is positioned inside sensing mandrel 122. FIGS. 5D, 5E, and 5F are left end, side elevation and right end views, respectively, of reference mandrel 126. At least a portion of reference mandrel 126 is spaced from the sensing mandrel 122 so as to provide a channel 128 therebetween for providing fluid communication for pressure equalizations therein with sensing mandrel 122.

A second optical fiber 130 is wound around reference mandrel 126, the first and second optical fibers comprising different arms of an interferometer. A tube 132 is in fluid communication with channel 128 for permitting pressure equalization between the exterior of hydrophone 120 and channel 128. A flexible membrane 134 covers the exterior opening of tube 132 for retaining a fluid in channel 128 between sensing mandrel 122 and reference mandrel 126. The fluid, such as oil, fills the interior of flexible membrane 134 and is in fluid communication with tube 132 and channel 128. The interior 146 of hydrophone 120 contains the optical coupler and other optical components and potted solid. Flexible membrane 134 may comprise vinyl, polyurethane, polyethelene, a sealed metal bellows, or other compliant material or structure. In one embodiment, the oil filled channel 128 is filled with Dow Corning silicone oil.

Sensing mandrel 122 and reference mandrel 126 are tubular in shape in this example embodiment. However, other shapes will occur to those of skill in the art. Reference mandrel 126 is in a substantially coaxial relationship with sensing mandrel 122. A pair of O-rings 136 seals sensing mandrel 122 to hydrophone 120. Reference mandrel 126 has grooves 138 formed on each end thereof for retaining O-rings 136 in sealing engagement with sensing mandrel 122. Alternatively, other suitable flexible sealing members (not shown) are used instead of O-rings 136, as will occur to those of skill in the art.

Flange 140 on reference mandrel 126 contains an orifice 142 for permitting access to channel 128 for filling channel 128 with fluid. Flange 140 contains a second orifice 144 for securing tube 132 to flange 140 by means of a screw or similar fastener. Tube 132 comprises, in one embodiment, a Helmholtz tube. In a more specific embodiment, Helmholtz tube 132 comprises a glass capillary. In the illustrated embodiment, one end of Helmholtz tube 132 is bonded into screw fitting 148, which fitting is threaded into flange 149 on reference mandrel 126.

In operation, tube 132 in fluid communication with flooded channel 128 permits pressure equalization between the exterior of hydrophone 120 and channel 128. Therefore, the hydrostatic pressures acting on the opposite sides of sensing mandrel 122 are equal. There is no pressure differential across sensing mandrel 122 that would tend to buckle or crush it.

However, although tube 132 allows the relatively constant hydrostatic pressure to equalize between the interior and exterior of the hydrophone, its small diameter acts as a low-pass filter by excluding or filtering out the seismic signal pressure wave from entering flooded channel 128.

Therefore, the seismic signal pressure variation acts only on the exterior, and not the interior, of sensing mandrel 122. Sensing mandrel 122 will thus deform in response to the seismic pressure wave as in the other embodiments described herein. The cut-off frequency of the low-pass filter provided by tube 132 depends on several factors: the viscosity and compressibility of the fluid in channel 128, the diameter of tube 132, the length of tube 132, and the volume of channel 128.

In hydrophone 120, flooded channel 128 functions as a compliant cavity backing sensing mandrel 122. The compressibility of the fluid filling channel 128 determines the compliance of flooded channel 128. Therefore, in alternative embodiments, the compliance of channel 128 is increased by including a small sealed air cavity (not shown) within channel 128.

O-rings 136 provide the seal for hydrophone 120 so as to prevent entry of environmental fluids therein. O-rings 136 also provide flexible seals at the ends of sensing mandrel 122. The flexible seals permit sensing mandrel 122 to deform many times repeatedly in response to incident seismic pressure waves without failure of the seals, as would occur if the seals were rigid. Thus, the useful life of hydrophone 120 is greatly extended. Other seals, and other shapes requiring a different number of seals, will occur to those of skill in the art.

Figure 6A:
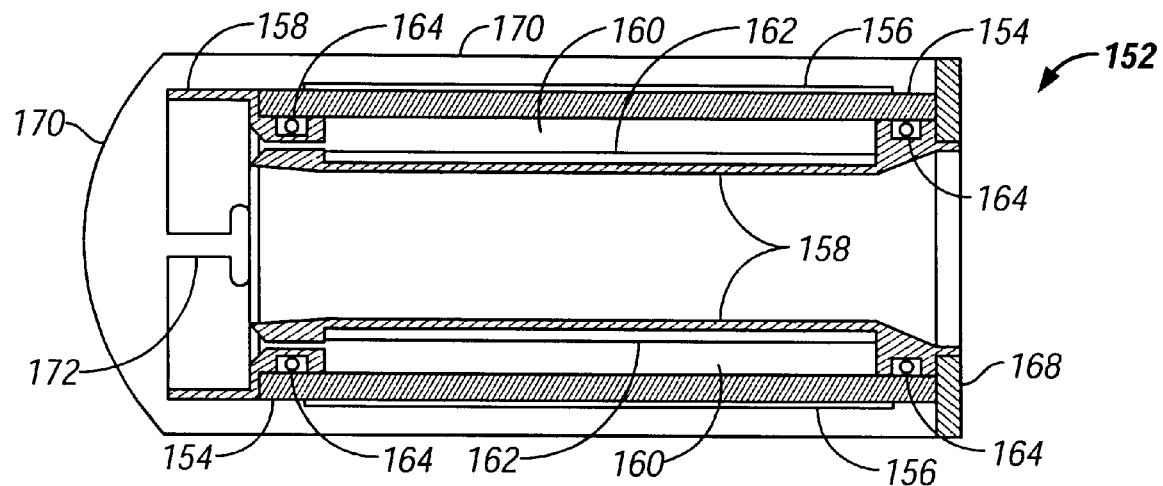
FIG. 6A is a cross sectional view along the longitudinal centerline of a fiber-optic hydrophone of a fifth embodiment of the invention in which the reference mandrel is positioned inside the sensing mandrel, but without a fluid filled channel between the two mandrels.
Figure 6B:
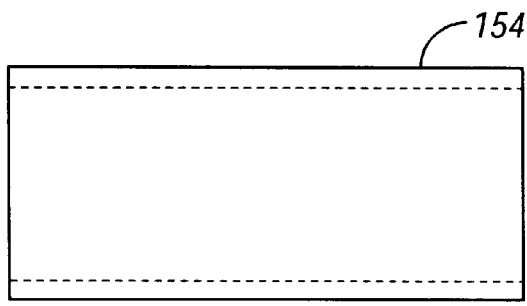
FIGS. 6B–6I illustrate the component parts of the hydrophone of FIG. 2A.
Figure 6C:
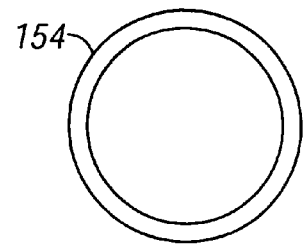
Figure 6D:
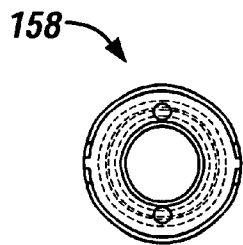
Figure 6E:
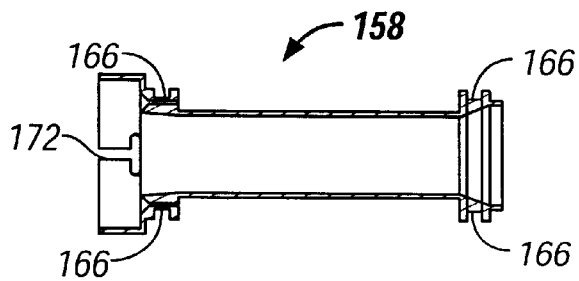
Figure 6F:
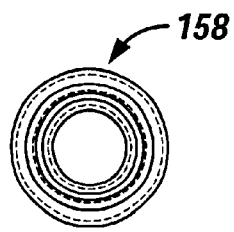
Figure 6G:
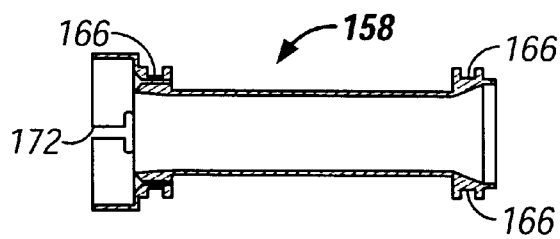

Referring now to FIG. 6A, there is shown a fiber-optic hydrophone, generally designated 152, according to a fifth embodiment of the invention. Hydrophone 152 includes a compliant sensing mandrel (or first body) 154 and a first optical fiber 156 wound around sensing mandrel 154. FIGS. 6B and 6C are side elevation and end views, respectively, of sensing mandrel 154. A rigid reference mandrel (or second body) 158 is positioned inside sensing mandrel 154. FIGS. 6D, 6E, and 6F are left end, side elevation, and right end views, respectively, of reference mandrel 158. FIG. 6G is a cross-sectional view along the longitudinal centerline of reference mandrel 158.

At least a portion of reference mandrel 158 is spaced from sensing mandrel 154 so as to provide a sealed cavity 160 between sensing mandrel 154 and reference mandrel 158. A second optical fiber 162 is wound around reference mandrel 158. First and second optical fibers 156 and 162 comprise different arms of an interferometer. A pair of O-rings 164 seal sensing mandrel 154 to reference mandrel 158. Alternatively, other suitable flexible sealing members (not shown) may be used instead of O-rings 154.

Figure 6H:
Figure 6I:
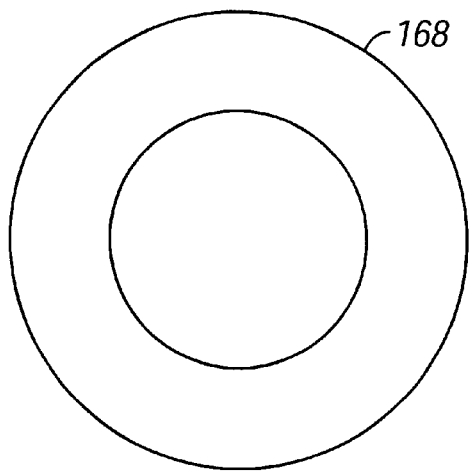

Sensing mandrel 154 and reference mandrel 158 are tubular in shape in this example embodiment. However, other shapes will occur to those of skill in the art. Reference mandrel 158 is in a substantially coaxial relationship with sensing mandrel 154. Reference mandrel 158 has a groove 166 on each end for retaining one of O-rings 164 in sealing engagement with sensing mandrel 154. A washer 168 is disposed on an end of hydrophone 152. FIGS. 6H and 6I are side and front elevation views, respectively, of washer 168. A jacket 170 surrounds at least a portion of hydrophone 152 for protecting the hydrophone from the environment. In one embodiment, jacket 170 comprises Kevlar reinforced Hytrel plastic. In another embodiment, jacket 170 comprises a urethene overmold. Reference mandrel 158 has a notch 172 formed on one end for passage of second optical fiber 162 therethrough for connection to optical components disposed within reference mandrel 158. The interior 174 of hydrophone 152 contains the optical coupler and other optical components and potted solid.

In all of the foregoing embodiments, the sensing and reference mandrels comprise, in some embodiments, polyether imide plastic (ULTEM 2200 or ULTEM 2300), polycarbonate, aluminum, and/or steel, for example. ULTEM is the trade name for a polyether imide plastic available from General Electric Co. If made with a plastic, the sensing and reference mandrels are molded (at relatively low cost in comparison to machining.) Also, in various embodiments, the interferometer comprises a Michelson type, a Mach-Zehnder type, a Fabry-Perot type, or other type of interferometer.

O-rings 164 provide the seal for cavity 160 so as to prevent entry of environmental fluids therein. O-rings 164 also provide flexible seals at the ends of sensing mandrel 154. The flexible seals permit sensing mandrel 154 to deform many times repeatedly in response to incident seismic pressure waves without failure of the seals, as would occur if the seals were rigid. Thus, the useful life of hydrophone 152 is greatly extended. Other seals, and other shapes requiring a different number of seals, will occur to those of skill in the art.

The fiber-optic hydrophone of the present invention, and many of its intended advantages, will be understood from the foregoing description of example embodiments, and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being merely exemplary embodiments thereof.

What is claimed is:

1. A fiber-optic hydrophone comprising:
   a compliant sensing mandrel;
   a first optical fiber wound around the compliant sensing mandrel;
   a rigid reference mandrel positioned adjacent to the compliant sensing mandrel;
   a second optical fiber wound around the rigid reference mandrel, the first and second optical fibers comprising different arms of an interferometer;
   at least one flexible sealing member sealing the compliant sensing mandrel to the hydrophone; and
   a support member disposed at least partially inside the sensing mandrel, at least a portion of the support member being spaced from the sensing mandrel so as to provide a sealed cavity between the sensing mandrel and the support member.

2. The hydrophone of claim 1, wherein the compliant sensing mandrel, the rigid reference mandrel, and the support member are tubular in shape.

3. The hydrophone of claim 1, wherein the sensing mandrel comprises a material selected from the group consisting of polyether imide plastic, polycarbonate, aluminum, and steel.

4. The hydrophone of claim 1, wherein the reference mandrel comprises a material selected from the group consisting of polyether imide plastic, polycarbonate, aluminum, and steel.

5. The hydrophone of claim 1, wherein the interferometer comprises one of a Michelson interferometer, a Mach-Zehnder interferometer, and a Fabry-Perot interferometer.

6. The hydrophone of claim 1, wherein the reference mandrel is in a substantially coaxial relationship with the sensing mandrel.

7. The hydrophone of claim 1, wherein the at least one flexible sealing member comprises at least one O-ring.

8. The hydrophone of claim 7, wherein the hydrophone includes two O-rings, one O-ring being disposed near each end of the sensing mandrel.

9. The hydrophone of claim 1, wherein the sealed cavity is filled with air.

10. The hydrophone of claim 1, wherein the sealed cavity is filled with an acoustic impedance matching fluid.

11. The hydrophone of claim 1, wherein the sealed cavity is filled with a substance comprising air and an acoustic impedance matching fluid.

12. The hydrophone of claim 1, further including a cap closing at least one end of the hydrophone so as to prevent entry of environmental fluids therein.

13. A fiber-optic hydrophone comprising:
a compliant sensing mandrel;
a first optical fiber wound around the compliant sensing mandrel;
a rigid reference mandrel surrounding the compliant sensing mandrel, the reference mandrel being spaced from the sensing mandrel so as to provide a sealed cavity therebetween;
a second optical fiber wound around the rigid reference mandrel, the first and second optical fibers comprising different arms of an interferometer;
for each mandrel, at least one flexible sealing member sealing the mandrel to the hydrophone;
a support member disposed inside the sensing mandrel, the support member being spaced from the sensing mandrel so as to provide a channel therebetween for providing fluid communication therein with the sensing mandrel; and
means for providing fluid flow into the channel.

14. The hydrophone of claim 13, wherein the compliant sensing mandrel, the rigid reference mandrel, and the support member are tubular in shape.

15. The hydrophone of claim 13, wherein the sensing mandrel is disposed concentrically and coaxially within the reference mandrel.

16. The hydrophone of claim 13, wherein the support member is disposed concentrically and coaxially within the sensing mandrel.

17. The hydrophone of claim 13, further including at least one end cap for securing the mandrels to the hydrophone and in spaced relation to one another.

18. The hydrophone of claim 17, wherein the means for providing fluid flow into the channel comprises at least one channel orifice in the end cap.

19. The hydrophone of claim 17, wherein the end cap includes means for permitting access from the exterior of the hydrophone to the sealed cavity therein.

20. The hydrophone of claim 19, wherein the means for permitting access to the sealed cavity comprises at least one sealed cavity orifice in the end cap.

21. The hydrophone of claim 17, wherein:
the flexible sealing member sealing the sensing mandrel to the hydrophone comprises an O-ring; and
the end cap has a groove formed therein for retaining the O-ring in sealing engagement with the sensing mandrel.

22. The hydrophone of claim 17, wherein:
the flexible sealing member sealing the reference mandrel to the hydrophone comprises an O-ring; and
for each end cap, the reference mandrel has a groove formed therein for retaining the O-ring in sealing engagement with the end cap.

23. The hydrophone of claim 17, wherein the support member comprises a tube having one end flared for engagement with a mating surface of the end cap.

24. The hydrophone of claim 13, wherein the sealed cavity is filled with a substance selected from the group consisting of air, or an acoustic impedance matching fluid, or a combination of both.

25. The hydrophone of claim 13, wherein the sensing mandrel comprises a material selected from the group consisting of polyether imide plastic, polycarbonate, aluminum, and steel.

26. The hydrophone of claim 13, wherein the reference mandrel comprises a material selected from the group consisting of polyether imide plastic, polycarbonate, aluminum, and steel.

27. The hydrophone of claim 13, wherein the interferometer comprises one of a Michelson interferometer, a Mach-Zehnder interferometer, and a Fabry-Perot interferometer.

28. A fiber-optic hydrophone comprising:
a compliant sensing mandrel;
a first optical fiber wound around the compliant sensing mandrel;
a rigid reference mandrel positioned adjacent the compliant sensing mandrel;
a second optical fiber wound around the rigid reference mandrel, the first and second optical fibers comprising different arms of an interferometer;
a housing enclosing the sensing and reference mandrels and the first and second optical fibers wound thereon, the housing being spaced from the sensing mandrel and first optical fiber so as to provide a sealed cavity therebetween;
at least one flexible sealing member sealing the housing to at least one of the sensing mandrel and the reference mandrel;
a support member disposed inside the sensing mandrel, the support member being spaced from the sensing mandrel so as to provide a channel therebetween for providing fluid communication therein with the sensing mandrel; and
means for providing fluid flow into the channel.

29. The hydrophone of claim 28, further including a cap closing at least one end of the hydrophone so as to prevent entry of environmental fluids therein.

30. The hydrophone of claim 28, wherein the means for providing fluid flow into the channel comprises at least one orifice opening from the channel to the exterior of the hydrophone.

31. The hydrophone of claim 30, wherein the support member includes a flange on one end thereof, the flange including a plurality of the orifices spaced apart therein.

32. The hydrophone of claim 28, further including means for retaining a fluid in the channel between the sensing mandrel and the support member.

33. The hydrophone of claim 32, wherein the means for retaining a fluid in the channel between the sensing mandrel and the support member comprises a flexible membrane covering the means for providing fluid flow into the channel, the fluid filling the interior of the flexible membrane and being in fluid communication with the channel.

34. The hydrophone of claim 33, wherein the fluid filling the interior of the flexible membrane and the channel comprises oil.

35. The hydrophone of claim 28, wherein the compliant sensing mandrel, the rigid reference mandrel, and the support member are tubular in shape.

36. The hydrophone of claim 28, wherein the sensing mandrel comprises a material selected from the group consisting of polyether imide plastic, polycarbonate, aluminum, and steel.

37. The hydrophone of claim 28, wherein the reference mandrel comprises a material selected from the group consisting of polyether imide plastic, polycarbonate, aluminum, and steel.

38. The hydrophone of claim 28, wherein the interferometer comprises one of a Michelson interferometer, a Mach-Zehnder interferometer, and a Fabry-Perot interferometer.

39. The hydrophone of claim 28, wherein the sensing mandrel and the reference mandrel are disposed end-to-end and coaxially.

40. The hydrophone of claim 28, wherein the at least one flexible sealing member comprises at least one O-ring.

41. The hydrophone of claim 40, wherein the hydrophone includes two O-rings, one O-ring being disposed near each end of the sensing mandrel.

42. The hydrophone of claim 41, further including a third O-ring disposed near the end of the hydrophone opposite the sensing mandrel.

43. The hydrophone of claim 28, wherein the sealed cavity is filled with a substance selected from the group consisting of air, or an acoustic impedance matching fluid, or a combination of both.

44. A fiber-optic hydrophone comprising:
a compliant sensing mandrel;
a first optical fiber wound around the compliant sensing mandrel;
a rigid reference mandrel positioned inside the sensing mandrel, at least a portion of the reference mandrel being spaced from the sensing mandrel so as to provide a channel therebetween for providing fluid communication therein with the sensing mandrel;
a second optical fiber wound around the rigid reference mandrel, the first and second optical fibers comprising different arms of an interferometer;
at least one flexible sealing member sealing the sensing mandrel to the hydrophone; and
a tube in fluid communication with the channel for permitting pressure equalization between the exterior of the hydrophone and the channel.

45. The hydrophone of claim 44, further including means for retaining a fluid in the channel between the sensing mandrel and the reference mandrel.

46. The hydrophone of claim 45, wherein the means for retaining a fluid in the channel between the sensing mandrel and the reference mandrel comprises a flexible membrane covering the exterior opening of the tube, the fluid filling the interior of the flexible membrane and being in fluid communication with the tube and the channel.

47. The hydrophone of claim 46, wherein the fluid filling the interior of the flexible membrane and the channel comprises oil.

48. The hydrophone of claim 44, wherein the sensing mandrel and the reference mandrel are tubular in shape.

49. The hydrophone of claim 44, wherein the reference mandrel is in a substantially coaxial relationship with the sensing mandrel.

50. The hydrophone of claim 44, wherein:
the at least one flexible sealing member sealing the sensing mandrel to the hydrophone comprises a pair of O-rings; and
the reference mandrel has a groove formed on each end thereof for retaining one of the O-rings in sealing engagement with the sensing mandrel.

51. The hydrophone of claim 44, wherein the reference mandrel has a flange disposed on an end thereof, and wherein the flange has an orifice formed therein for permitting access to the channel for filling the channel with fluid.

52. The hydrophone of claim 44, wherein the reference mandrel has a flange disposed on an end thereof, and wherein the tube is secured to the flange.

53. The hydrophone of claim 44, wherein the tube comprises a Helmholtz tube.

54. The hydrophone of claim 44, wherein the sensing mandrel comprises a material selected from the group consisting of polyether imide plastic, polycarbonate, aluminum, and steel.

55. The hydrophone of claim 44, wherein the reference mandrel comprises a material selected from the group consisting of polyether imide plastic, polycarbonate, aluminum, and steel.

56. The hydrophone of claim 44, wherein the interferometer comprises one of a Michelson interferometer, a Mach-Zehnder interferometer, and a Fabry-Perot interferometer.

57. A fiber-optic hydrophone, comprising:
a compliant sensing mandrel;
a first optical fiber wound around the compliant sensing mandrel;
a rigid reference mandrel positioned inside the sensing mandrel, at least a portion of the reference mandrel being spaced from the sensing mandrel so as to provide a sealed cavity between the sensing mandrel and the reference mandrel;
a second optical fiber wound around the rigid reference mandrel, the first and second optical fibers comprising different arms of an interferometer; and
a pair of O-rings sealing the sensing mandrel to the reference mandrel.

58. The hydrophone of claim 57, wherein the sensing mandrel and the reference mandrel are tubular in shape.

59. The hydrophone of claim 57, wherein the reference mandrel is in a substantially coaxial and concentric relationship with the sensing mandrel.

60. The hydrophone of claim 57, wherein the reference mandrel has a groove disposed on each end thereof for retaining one of the O-rings in sealing engagement with the sensing mandrel.

61. The hydrophone of claim 57, wherein the hydrophone has opposite ends, and further including a washer disposed on an end of the hydrophone.

62. The hydrophone of claim 57, further including a jacket surrounding at least a portion of the hydrophone for protecting the hydrophone from the environment.

63. The hydrophone of claim 57, wherein the reference mandrel has a notch formed on one end thereof for passage of the second optical fiber therethrough for connection to optical components disposed within the reference mandrel.

64. The hydrophone of claim 57, wherein the sensing mandrel comprises a material selected from the group consisting of polyether imide plastic, polycarbonate, aluminum, and steel.

65. The hydrophone of claim 57, wherein the reference mandrel comprises a material selected from the group consisting of polyether imide plastic, polycarbonate, aluminum, and steel.

66. The hydrophone of claim 57, wherein the interferometer comprises one of a Michelson interferometer, a Mach-Zehnder interferometer, and a Fabry-Perot interferometer.

67. A method for detecting pressure in a marine environment, the method comprising:

sensing motion of a first body in response to a pressure wave, the first body being in movable contact with a cavity, the cavity being defined, in part, by the first body and a second body; and flexibly isolating the cavity from the marine environment at a joint between the first body and the second body.

68. The method of claim 67, wherein the step of sensing motion of a first body in response to a pressure wave comprises:

temporarily deforming the first body by exposing the first body to the pressure wave; and temporarily deforming the length of a first optical fiber associated with the first body so as to vary the phase of light traversing the first optical fiber with respect to the phase of light traversing a second optical fiber associated with the second body.

69. The method of claim 68, wherein the step of flexibly isolating the cavity at a joint between the first body and the second body comprises:

absorbing strain induced by the temporary deformation of the first body in a flexible sealing member disposed at the joint between the first body and the second body.

70. A system for detecting pressure in a marine environment, the system comprising:

means for sensing motion of a first body in response to a pressure wave, the first body being in movable contact with a cavity, the cavity being defined, in part, by the first body and a second body; and means for flexibly isolating the cavity from the marine environment at a joint between the first body and the second body.

71. The system of claim 70, wherein the means for sensing motion of a first body in response to a pressure wave comprises:

a first optical fiber wound around the first body; and a second optical fiber wound around the second body, wherein the optical phase of light traversing the first optical fiber is shifted with respect to the optical phase of light traversing the second optical fiber when the first body is temporarily deformed in response to the pressure wave.

72. The system of claim 71, wherein the means for flexibly isolating the cavity at a joint between the first body and the second body comprises:

a flexible sealing member disposed at the joint between the first body and the second body for absorbing strain induced by temporary deformation of the first body in response to the pressure wave.

* * * * *